(No Model.)
C. M. CONRADSON & B. V. NORDBERG.
ADJUSTABLE BEARING FOR CONNECTING RODS, &c.
No. 490,639. Patented Jan. 31, 1893.
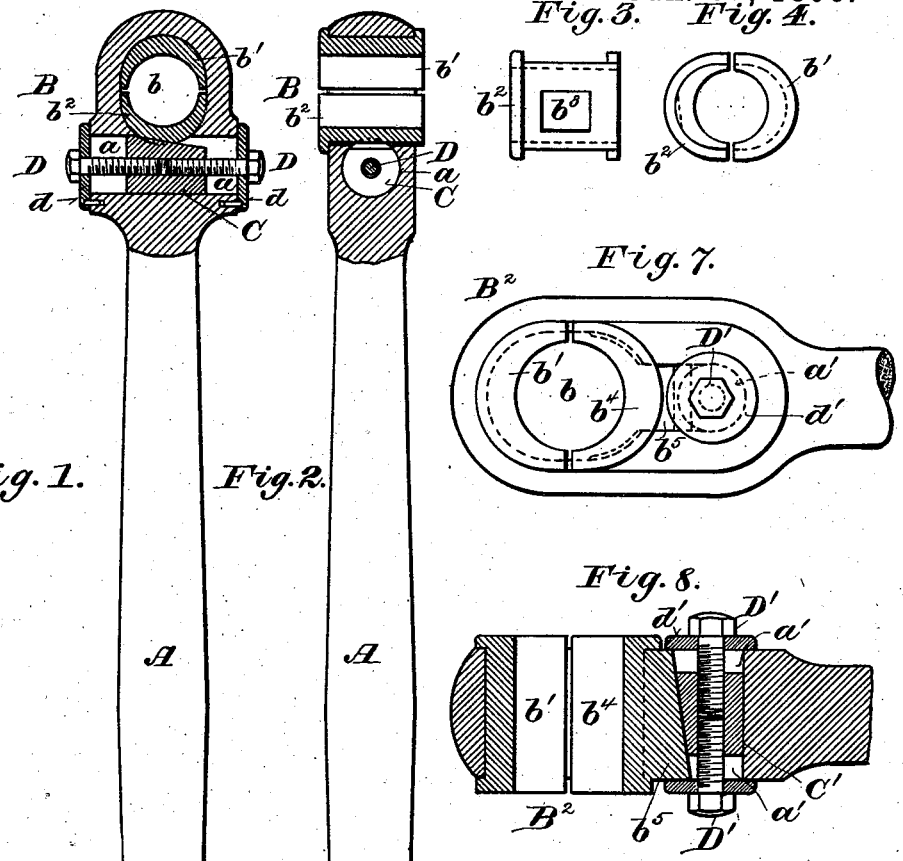
Witnesses:
Inventors:
Conrad M. Conradson
Bruno Victor Nordberg
By Winkler Flanders Smith Bottum Vilas
Attorneys.

UNITED STATES PATENT OFFICE.

CONRAD M. CONRADSON AND BRUNO VICTOR NORDBERG, OF MILWAUKEE, WISCONSIN.

ADJUSTABLE BEARING FOR CONNECTING-RODS, &c.

SPECIFICATION forming part of Letters Patent No. 490,639, dated January 31, 1893.

Application filed July 13, 1889. Serial No. 317,370. (No model.)

*To all whom it may concern:*

Be it known that we, CONRAD M. CONRADSON and BRUNO VICTOR NORDBERG, both of Milwaukee, in the county of Milwaukee and State of Wisconsin, have invented certain new and useful Improvements in Adjustable Bearings for Connecting-Rods, &c.; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of our invention is saving of labor and the consequent diminution of cost in the manufacture of adjustable bearings for connecting rods, &c.

It consists essentially of a head or bearing block having a slotted opening and a cylindrical key seat cutting said opening, two bearing pieces or brasses adapted to be inserted in said opening, one movable toward and from the other, and a key adapted to said cylindrical seat and having a bearing surface inclined to its axis, and of certain other peculiarities or construction and arrangement hereinafter specifically set forth and pointed out in the claims.

In the accompanying drawings like letters designate the same parts in the several figures.

Figure 1 is a side elevation of a connecting rod embodying our improvements. Fig. 2 is a plan or top view of the same. Fig. 3 is a side or back elevation of the adjustable brass. Fig. 4 is an end elevation of the two brasses. Figs. 5 and 6 are detail views of the key, Fig. 5 being a side elevation and Fig. 6 an end view, and Figs. 7 and 8 are respectively a side elevation and a section taken axially through the journal bearing, of a modified form of head.

Referring to Figs. 1 to 6 inclusive, A represents a connecting rod having heads B and B' integral therewith. Each head is formed with a slotted or oval opening $b$ at right angles to its axis, for the reception of two brasses or bearing pieces $b'$ $b^2$ rounded on their outer faces to fit the ends of the opening $b$ in which they are inserted. The opening $b$ may be produced by first drilling a hole through the head and then elongating and finishing such hole by a milling or other suitable tool. The brasses or bearing pieces may also be drilled and turned or milled to the desired shape and finish. The brass $b'$ which is first inserted in opening $b$ may be provided as shown with a flange at each end, while the brass $b^2$ which is last placed in said opening has a flange on one end only.

The head B has a cylindrical key seat $a$ bored or drilled through it transversely to the axis of the bearing, and cutting the inner end of the opening $b$, and the head B' has a like key seat cutting the outer end of the opening $b$ therein. By this arrangement of the key seats on corresponding sides of both bearings the adjustment in taking up wear does not change the distance between the centers of the bearings.

In each key seat is fitted a key C formed with a surface $c$ inclined to its axis and adapted to bear against a correspondingly inclined surface $b^3$ (Fig. 3) on the back of the adjacent brass or bearing piece $b^2$. For the purpose of moving the keys C lengthwise in their seats, we provide each with two adjusting screws D. D. which are inserted and work in the opposite ends of a threaded perforation passing longitudinally through the key. These adjusting screws pass through and bear at their heads against the outer faces of washers $d$. $d$. placed over the ends of the key seat. In place of the washers $d$. $d$., the heads of the screws D. D. may be made of sufficient size to take a bearing on the head at the ends of the key seat therein.

Referring to Figs. 7 and 8, the key seat $a'$ is bored drilled or otherwise formed in the head $B^2$ parallel with the axis of the bearing and is slotted into the opening $b$ which receives the brasses $b'$ and $b^4$. The movable brass $b^4$ has on the back a projection $b^5$ provided with a bearing surface inclined to the key seat and axis of the bearing, and adapted to enter the key seat on one side. In the key seat is inserted a key C' adapted thereto and formed with an inclined bearing surface, corresponding with and adapted to bear against the inclined surface on the projection $b^5$ of the brass $b^4$. This key may be moved endwise in its seat and locked in place by adjusting screws D' D' bearing at the heads on washers d' d' placed over the ends of the key seat a', or by any other suitable means. It is obvious that the same result would be effected if the key seat a' were made oblique to the axis of the bearing and the face of projection $b^5$ of the adjustable brass $b^4$ bearing against the inclined face of the key were made parallel with the axis of the bearing. It is also obvious that the heads may be made separately from and attached in any suitable manner to the connecting rod.

For convenience of illustration we have shown our improvements as applied to connecting rods, but they are applicable to other adjustable bearings in which a key is employed to move the adjustable bearing piece or brass.

We claim:—

1. A head having a slotted opening and a cylindrical key seat cutting one end of said opening, in combination with two bearing pieces inserted in said opening, one movable toward the other, and a key adapted to said key seat and formed by the intersection of a cylinder and a plane inclined to its axis, substantially as and for the purposes set forth.

2. A head having an oval opening in combination with two bearing pieces having rounded backs adapted to said opening, one being movable toward the other, a cylindrical key seat cutting one end of said opening, and a key adapted to said seat and formed by the intersection of a cylinder and a plane inclined to the axis of the cylinder, substantially as and for the purposes set forth.

3. A head having an oval opening and a cylindrical key seat cutting one end of said opening in combination with two bearing pieces adapted to said opening, one movable toward the other, and a key adapted to said key seat and having a surface inclined to its axis, substantially as and for the purposes set forth.

4. A head having an oval opening and a cylindrical key seat cutting one end of said opening, in combination with two bearing pieces, one movable toward the other, and having rounded exterior faces adapted to said opening, and a key adapted to said key seat and having a bearing surface inclined to its axis, substantially as and for the purposes set forth.

In testimony that we claim the foregoing as our own we affix our signatures in presence of two witnesses.

CONRAD M. CONRADSON.
BRUNO VICTOR NORDBERG.

Witnesses:
JOHN HURLEY,
CHAS. L. GOSS.